UNITED STATES PATENT OFFICE.

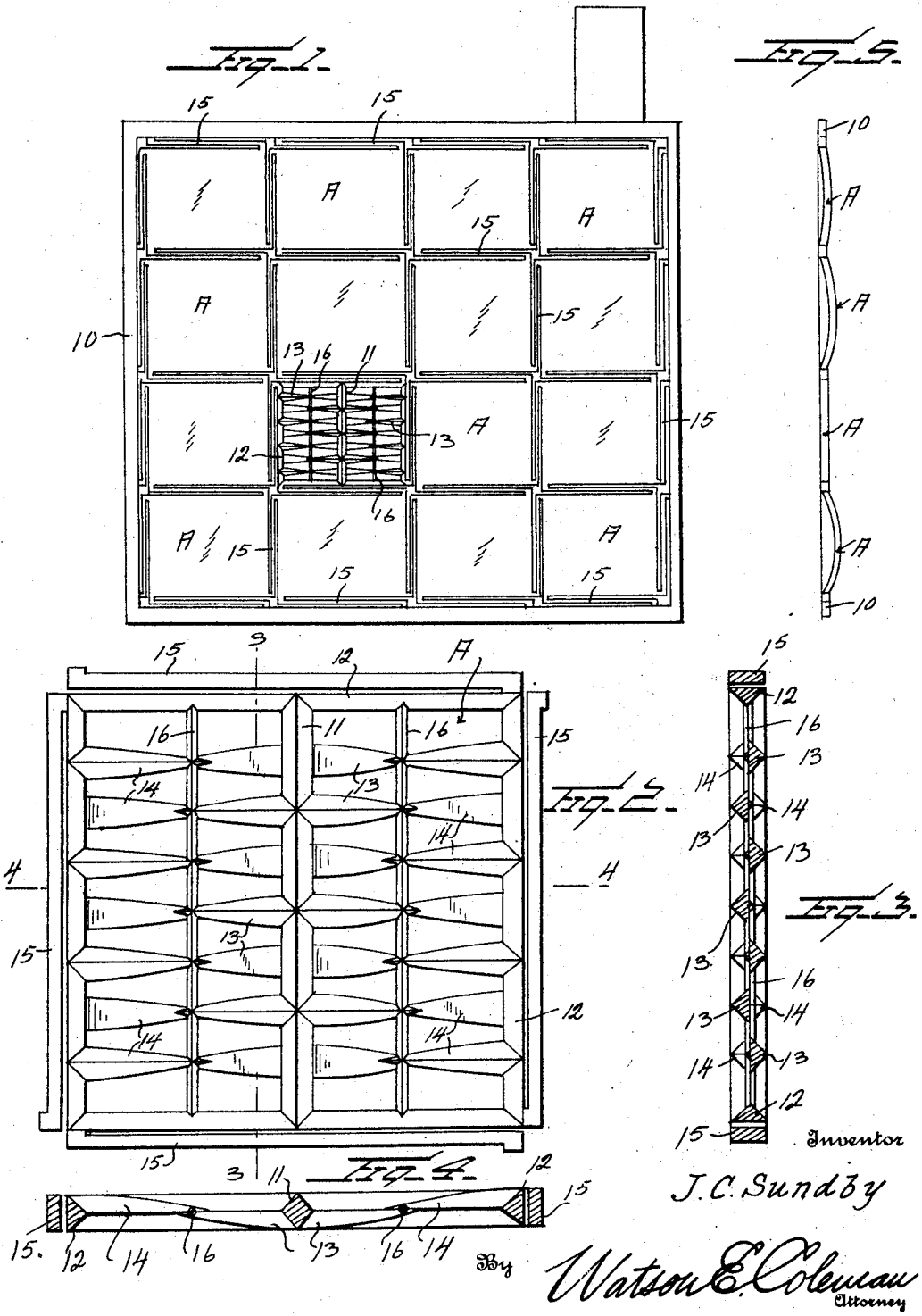

JOHN CLARENCE SUNDBY, OF ENDERLIN, NORTH DAKOTA, ASSIGNOR TO SUNDBY BATTERY & MANUFACTURING COMPANY, OF ENDERLIN, NORTH DAKOTA, A CORPORATION OF NORTH DAKOTA.

GRID FOR STORAGE BATTERIES.

1,389,018.   Specification of Letters Patent.   Patented Aug. 30, 1921.

Application filed September 7, 1920. Serial No. 408,707.

*To all whom it may concern:*

Be it known that I, JOHN CLARENCE SUNDBY, a citizen of the United States, residing at Enderlin, in the county of Ransom and State of North Dakota, have invented certain new and useful Improvements in Grids for Storage Batteries, of which the following is a specification, reference being had to the accompanying drawings.

This invention relates to storage batteries, and particularly to the construction of the battery grids or plates forming the battery elements.

In storage batteries as ordinarily constructed, the grids or plates of battery elements tend to buckle, particularly in those storage batteries using a double sulfate, and in battery plates heavily charged and where a non-uniform sulfation exists, these plates or grids buckle on account of a nonuniform heating therein.

One of the objects of my invention is to provide a battery grid which is so constructed as to prevent undue buckling of the plate and to minimize this buckling and thus prevent damage being done to the separators between the battery plates and prevent short circuiting.

A further object is to provide a battery grid or plate so constructed that slight buckling may occur at a relatively large number of points and thus prevent a relatively large buckling of the plate as a whole.

A further object is to so construct the battery grid that the grid is relatively weak at a plurality of points so as to permit those portions of the grid between the weakened points or places to buckle, thus preventing any buckling of the grid as a whole.

Still another object is to provide a battery grid which is made up of a series of connected units supported within a frame, the units being so connected to each other that each unit may have a certain degree of movement without affecting the other adjacent units, and whereby any one unit may buckle without causing the buckling of an adjacent unit.

Other objects will appear in the course of the following description.

My invention is illustrated in the accompanying drawings, wherein:—

Figure 1 is a front elevation of a storage battery element constructed in accordance with my invention, one of the units having the "face" removed therefrom to show the construction of the grid itself;

Fig. 2 is an enlarged face view of one of the units of the grid;

Fig. 3 is a section on the line 3—3 of Fig. 2;

Fig. 4 is a section on the line 4—4 of Fig. 2;

Fig. 5 is a diagrammatic view showing the manner in which the various units will locally deflect or warp without warping the general plane of the grid.

As illustrated in Figs. 1 to 4, my improved grid consists of a frame 10 which constitutes the supporting frame of the grid. This frame may be made of any suitable material, such as antimonial lead. The frame 10 supports within it a series of units A, one of which is illustrated in detail in Fig. 2. Each unit comprises a central, longitudinally extending bar 11 and an exterior rectangular frame 12. This frame 12, as illustrated in Fig. 3, is triangular in cross section, while the central rod or bar 11 is diamond-shaped in cross section. Extending laterally from the central bar 11 is a plurality of arms or webs 13 which are connected by integral webs 14 with the sides of the frame 12. The webs 14 are integral with the webs 13 but they project in a horizontal plane in an opposite direction to the webs 13. These webs 13 and the webs 14 are approximately triangular in cross section, but it will be seen that the flat side of the web 13 intersects the axial line of the rod 11 so that all of any web 13 or portions of a web 13 are disposed on one side of a plane passing through the axial line of the central supporting bar 11. The web 14 has its flat face disposed in the same plane as the flat face of the web 13, but projects out in the opposite direction to the web 13 so that the portion 14 is disposed on one side of a transverse plane cutting through the axis of the rod 11, while the web 13 is disposed on the opposite side of said axial plane.

It will likewise be seen from Fig. 4 that the web 13 tapers from the rod 11 toward its ends, and that the web 14 has its inner ends tapering in an opposite direction to the extremities of the webs 13. The webs 13 are alternately disposed on opposite sides of the transverse plane extending through the axis of the rod 11 so that one web 13 projects in one direction, the next adjacent web projects in the opposite direction, and so on alternately, and the same is true of the webs 14.

They alternately project in opposite directions. This is fully illustrated in the sectional view in Fig. 3. The webs 13 and 14 and the rod 11 have the same width as the marginal frame portion 12, and these webs 13 and 14 and the marginal frame portion 12 are triangular in cross section, while the central rod 11, as before stated, is diamond-shaped or square in cross section. This unit illustrated in Fig. 2 is to be molded, the mold being formed by a milling cutter or like tool.

The units are connected to each other and to the frame 10 by connecting members 15 which extend parallel to the side edges of each unit and are connected at one end to the unit, as by soldering or being cast therewith, and are connected at the other end to the frame 10 by soldering, welding, casting or the like. These connecting members 15 are of lead and have a width as wide as the space between the units and as thick as the thickness of the grid proper. The purpose of these connectors 15 is to establish as high a degree of flexibility as possible between the units, thereby reducing the chances of one unit distorting an adjacent unit when one unit becomes buckled and localizing the buckling to the individual unit.

It is to be understood that all surfaces engaging with or having contact with the active material shall be knurled or roughened in order to secure a good contact with the active material. The entire grid may be made of antimonial lead including the frame and the connectors, or the frame and connectors 15 may be made of pure lead or another composition. Preferably the grid is also formed with two relatively small connecting bars 16 which extend parallel to the middle bar 11 and intersect the webs 13 and 14 and the bars 12 of the frame. These bars 16 are considerably smaller than the bar 11 and are preferably diamond-shaped in cross section, though I do not wish to be limited to this.

In Fig. 5 is illustrated diagrammatically the action of the battery plates when buckling. It will be seen from this figure that each of the units A can buckle individually without affecting the plate as a whole, and this is further aided by the fact that the units A are connected to the frame 10 and to each other by the connecting strips 15 which are so attached to the units and to the frame as to permit the utmost freedom of movement of the individual plates. This is secured by the relative length of the connectors 15, and the fact that they are each connected at one end to the frame 10 or to an adjacent unit and at the other end to the other unit. Thus the maximum flexibility is secured for the units without deforming or warping the frame 10 itself or shifting the individual units.

It will be seen with reference to the construction illustrated that the connectors 15 keep the units apart yet support these units in electrical engagement with each other but permit the passage of the electrolytic fluid around and through the grid. The grid formed as described is to be covered with a paste made of lead oxid for the negative and lead peroxid for the positive plates. As before stated, a grid constructed of these units will not buckle as a whole, as a solid plate will do, and thus no great strain will be exerted on the separator between the battery plates, tending to break up and thus set up a short circuit, but each of the units will separately buckle under non-uniform heating, as indicated diagrammatically in Fig. 5, and thus the plate will buckle slightly at a plurality of points instead of there being a deformation of the entire plate. The general plane of my improved grid will be but slightly changed by local deformation.

My idea covers broadly the use of a plate built up of units, each unit capable of buckling, and preferably each unit being so constructed that it may yield at a plurality of points. Thus the unit illustrated in Fig. 2 has a tendency to yield between the webs 13 and 14 and thus those portions of the unit between one set of webs 13 and 14 and the next adjacent set of webs 13 and 14 forms a section which might bulge or deform in one direction while the next set might be bulged or deformed in the opposite direction. It is also to be noted that in the construction illustrated in Fig. 2, the faces of these webs extend in opposite directions from each other, that is the webs 14 extend in opposite directions from the webs 13, and these are alternately set with relation to the next adjacent webs 13 and 14 and thus tend to resist and counterbalance any tendency to buckle. No battery grid or plate known to me is so constructed as to resist this tendency to buckle by providing portions which are placed and extend in opposite directions, nor in any battery plate known to me is there a series of unit portions which may individually buckle, thus preventing the entire plate from buckling as a whole. A battery having plates of the character described has a relatively great endurance for the reason that all storage batteries are based on the action of a double sulfate and where uniform sulfation does not exist and the battery is heavily charged, the elements or grids will buckle on account of the non-uniform heating therein. It is, of course, an easy matter to overcharge the battery and thus cause the buckling of the plates, but with my improved plates, this overcharging of the battery will not cause such a buckling of the plates as will seriously injury the battery.

I claim:—

1. As an article of manufacture, a unit for battery grids or elements comprising a rectangular, lead frame having a longitudinally extending member connecting two sides of the frame, said member having laterally extending portions at intervals along its length, said laterally extending portions being disposed alternately on one side or the other of the median plane of said grid, there being members extending from the frame inward to said laterally extending portions and engaging them and being disposed on the opposite side of said median plane from the member with which they are engaged, said frame and said laterally extending members being triangular in cross section, and paste deposited within said frame and covering all portions thereof.

2. A battery element or grid comprising a metallic, substantially polygonal frame, a plurality of separate and independent polygonal paste supporting units disposed within said frame, and connecting members extending approximately parallel to the sides of adjacent units, the connecting members of those units adjacent the outer frame being connected thereto at one end and at their other ends being connected each to one unit, the connecting members of those units not adjacent the frame being connected each at one end to the edge of one of said units and at its opposite end being connected to an adjacent unit, the body of each connecting member between said points of connection being entirely spaced from the adjacent unit or frame.

In testimony whereof I hereunto affix my signature.

JOHN CLARENCE SUNDBY.